FASTENER DRIVING TOOL

Original Filed May 21, 1965 3 Sheets-Sheet 1

INVENTOR
HOWARD B. RAMSPECK by
Mason, Kolehmainen, Rathburn and Wyss
ATTORNEYS.

FASTENER DRIVING TOOL

Original Filed May 21, 1965 3 Sheets-Sheet 2

INVENTOR
HOWARD B. RAMSPECK
by
Mason, Kolehmainen, Rathburn and Wyss.
ATTORNEYS.

FASTENER DRIVING TOOL

Original Filed May 21, 1965 3 Sheets-Sheet 3

INVENTOR
HOWARD B. RAMSPECK
by
Mason, Kolehmainen, Rathburn and Wyss
ATTORNEYS.

United States Patent Office

Re. 27,207
Reissued Oct. 26, 1971

27,207
FASTENER DRIVING TOOL

Howard B. Ramspeck, Chicago, Ill., assignor to Fastener Corporation, Franklin Park, Ill.

Original No. 3,353,453, dated Nov. 21, 1967, Ser. No. 457,767, May 21, 1965. Application for reissue Oct. 31, 1969, Ser. No. 871,500
Int. Cl. F15b *11/15, 13/042, 15/22*
U.S. Cl. 91—356 24 Claims

Matter enclosed in heavy brackets [ ] appears in the original patent but forms no part of this reissue specification; matter printed in italics indicates the additions made by reissue.

ABSTRACT OF THE DISCLOSURE

A control valve on a pneumatic stapler is effective to drive the power piston mounted in the power cylinder through its drive stroke and automatically and sequentially through a return stroke whether or not the trigger has been released. This is accomplished by providing two valve members operatively interrelated with a delay mechanism or lost motion-dashpot connection therebetween to control the return of the piston upon completion of its drive stroke.

This invention relates to a fastener driving tool and, more particularly, to a fastener driving tool including new and improved control means, and to control means for a fastener driving tool.

Commercial pneumatic fastener driving tools generally employ either compression spring or pneumatic piston return means. Thus when the trigger of a fastener driving tool is depressed, the power piston and connected fastener driving blade are driven through the power stroke of a fastener driving operation by the admission of pressurized fluid into the power cylinder of the tool. The power piston will remain at the end of its power stroke until the fluid pressure is released, as by exhausting the cylinder to the atmosphere, at which time the compression spring or pneumatic piston return means is effective to return the piston to its normal or static position. Pneumatic fastener driving tools are known wherein the power piston and driving blade move both down and up automatically upon depression of the trigger, before the trigger is released. This snap-action piston and driving blade operation is desirable in many applications such as upholstery stapling to prevent fraying of the material by the driving blade while the tool is moved along the workpiece.

Accordingly one object of the present invention is to provide a new and improved pneumatically actuated fastener driving tool.

Yet another object of the present invention is to provide a fastener driving apparatus including new and improved control valve means for initiating operation of a fastener driving operation.

A further object of the present invention is to provide a fastener driving tool having new and improved means for driving the power piston and driver blade both down and up automatically before the trigger is released.

A further object of the present invention is to provide a fastener driving apparatus having a control valve which automatically and sequentially connects the power cylinder first to a fluid reservoir and then to the atmosphere without the necessity of releasing the trigger.

Yet a further object of the present invention is the provision of a new and improved control valve for a fastener driving tool which is effective to cycle the power piston and driver blade through the power and return strokes automatically upon depression of the trigger.

In accordance with these and many other objects, the improved control valve according to the present invention controls a pneumatically actuated fastener driving tool or apparatus of the type having a housing with a forward head portion and a rearwardly extending hollow handle forming a compressed air or fluid reservoir and housing the improved control valve. The head portion includes a generally vertically extending cylinder having an upper open end which may be sequentially exhausted to the atmosphere, or connected to the reservoir of pressurized fluid, by the depression of the trigger. In the normal or static condition of the fastener driving apparatus, the power cylinder is exhausted to the atmosphere. Upon depression of the trigger, the control valve is effective to connect the power cylinder first to the fluid reservoir, and thereafter sequentially and automatically exhausted to the atmosphere with a snap action of the control valve without the necessity of releasing the trigger.

The forward head portion of the tool including the power piston and driver blade may be of any known suitable type, such as the commercially available spring return or pneumatic return types. The illustrated embodiment by way of example discloses a pneumatic return power piston described and claimed in a copending application of Oscar A. Wandel entitled "Fastener Driving Tool" and filed on even date herewith.

More specifically the improved control valve assembly includes a valve chamber having a first port communicating with the atmosphere, a second port communicating with the fluid reservoir, and a third port communicating with the power cylinder. The ports communicating with the atmosphere and with the fluid reservoir of define valve seats in the valve chamber. A first or upper valve stem means is provided with valve elements alternately cooperable with respective ones of the seats to alternately connect the cylinder port to the port exhausting to the atmosphere or to the port communicating with the fluid reservoir. Additionally the control valve includes a valve cylinder and a second or lower valve stem means having a portion telescopically receivable in a recess in the upper valve stem means and further having integral therewith a piston slideable within the valve cylinder. Differential pressure acting on the valve steam means will move the upper valve stem means down, closing the exhaust of air from the power cylinder to the atmosphere, and simultaneously connecting the power cylinder to the fluid reservoir to provide for driving the power cylinder and driver blade through its power stroke. Time pressurized fluid from the fluid reservoir to act against a lower piston connected to the lower valve stem means so that the differential pressure acting on the upper valve stem means will automatically return the upper valve stem means to its initial or normal position wherein the communication between the power cylinder and the fluid reservoir is blocked, and the power cylinder is exhausted to the atmosphere. Consequently the power piston and driver blade will automatically return to their normal position without the necessity of releasing the trigger. When the trigger is subsequently released, pressurized fluid from the fluid reservoir will enter the valve cylinder and bias the lower valve stem means upwardly against the upper valve stem means so as to hold the upper valve stem means in its normal or static position until such time as the trigger is again depressed to repeat the cycling of the fastener driving tool.

In order to provide the time delay operation of the valve to permit automatic resetting of the power piston, the upper valve means with its upper piston is provided with the recess forming a cylinder and the lower valve stem means is cooperatively associated with the piston having the portion telescopically received in the recess. One of the valve pistons is provided with a skirt depending toward the other to define a dashpot chamber formed beween the two pistons. During the power stroke of the astener driving tool, pressurized fluid from the fluid eservoir is bled at a metered rate into this dashpot cham- ›er to provide a pressure differential on the upper valve tem means and to drive the upper valve stem means up- vardly thereby shutting off the pressurized fluid from the ›ower cylinder and exhausting the cylinder to the atmos- ›here.

Many other objects and advantages of the present in- 'ention will become apparent from considering the fol- owing detailed descriptions in conjunction with the draw- ngs in which.

Figure 1:
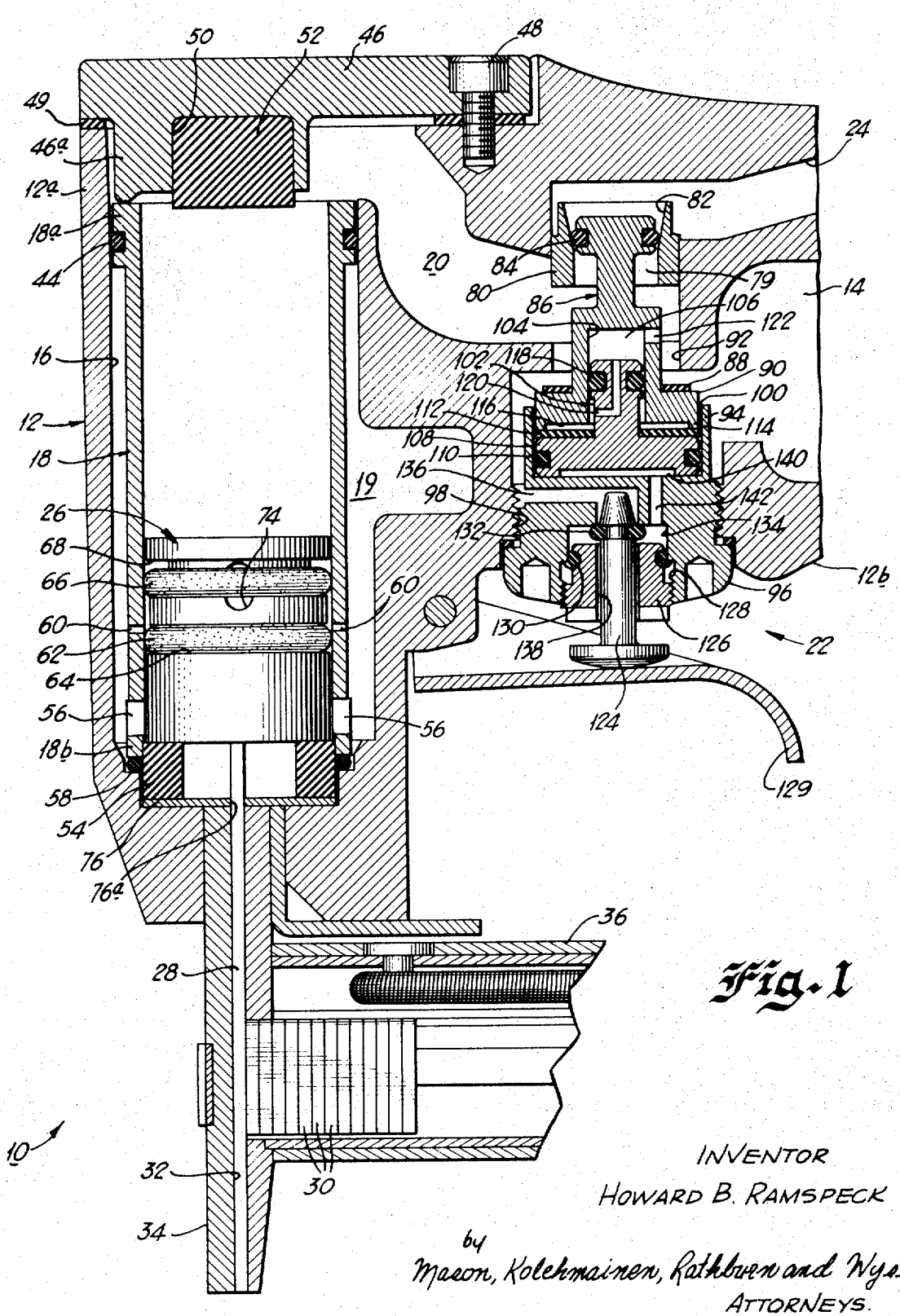
FIG. 1 is a fragmentary sectional view of a fastener lriving tool embodying the present invention and illus- rated with the piston and driver blade at the bottom of ts power stroke.
Figure 2:
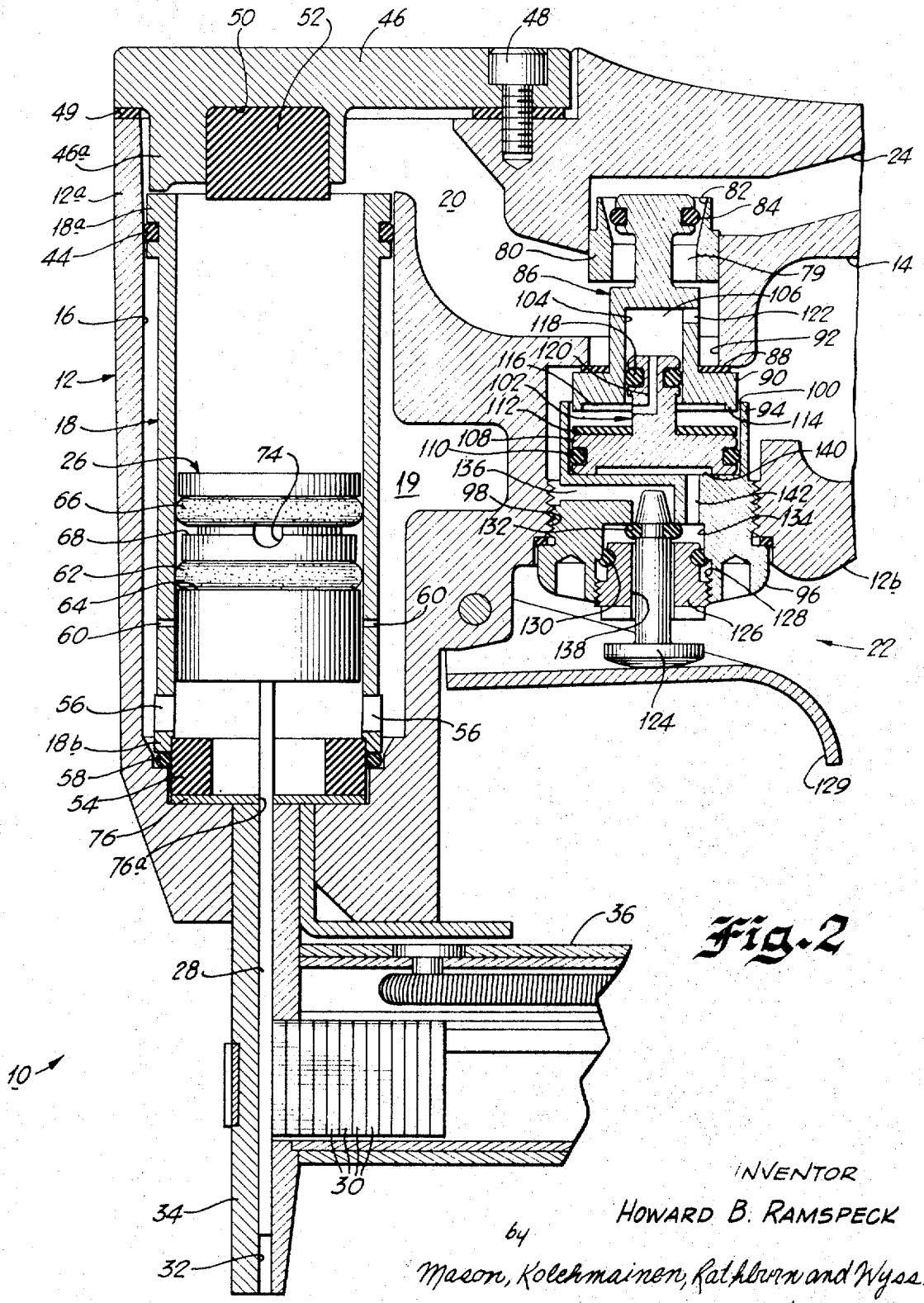
FIG. 2 is a fragmentary sectional view similar to FIG. , illustrating the fastener driving tool of FIG. 1, with he piston and driver blade intermediate its return stroke; nd

Referring now specifically to the drawings, there is illus- rated a fastener driving tool which is indicated generally s 10 and which embodies a control valve assembly ac- ording to the present invention. It is understood that the ›ol 10 may be of any suitable type having a spring or ›neumatically returned power piston; the piston return nechanism of the illustrated tool is described and claimed n the above mentioned Wandel application. However, ›riefly the tool 10 includes a housing 12 having a forward nd generally vertically extending head portion 12*a* and . rearwardly extending hollow handle portion 12*b* form- ng an air or fluid reservoir 14 to which a pressurized fluid, uch as compressed air, is supplied in any suitable manner, s by a flexible airline. The head portion 12*a* of the hous- ng 12 includes a cavity 16 in which is mounted a sleeve orming cylinder 18. An air return chamber 19 is de- ned in the cavity by the cylinder sleeve 18. The lower nd of the cylinder 18 is in communication with the hamber 19 and an open upper end thereof is in continu- ›us communication with a port or passageway 20 formed n the housing. A manually actuated control valve assem- ly which is indicated generally as 22 normally connects he passageway 20 to the atmosphere through a passage- ›ay 24 formed in the hollow handle portion 12*b* and is ›perable to a position in which it connects the passageway 0 to the fluid in the reservoir 14. The fluid admitted to he passageway 20 enters the open upper end of the cylin- er 18 and drives a power piston 26 which is slidably ›ounted within the cylinder 18 and which is secured to he upper end of a fastener driver blade 28 downwardly o that the lower end of the driver blade 28 engages and rives a fastener 30 supplied one at a time to a drive track 2 in a nosepiece assembly 34 by a magazine assembly ndicated generally as 36.

During the downward movement of the piston 26, the ir disposed within the cylinder 18 below the piston 26 is riven through a plurality of ports in the lower wall of he cylinder 18 into the return air chamber 19. When the ompressed air disposed above the piston 26 is exhausted › the atmosphere under the control of the control valve ssembly 22, air pressure from the return air chamber 19 › effective to act on the lower surface of the piston 26 to eturn the piston from its displaced position adjacent the ›wer end of the cylinder 18 to a normal position adjacent he open upper end thereof.

The mechanical construction of the housing 12 and he magazine assembly 36 is disclosed in detail in an pplication of Thomas H. Dorney, Ser. No. 326,913, filed Nov. 29, 1963, and assigned to the same assignee as the ›resent invention. In general, the head portion 12*a* of he housing 12 includes a structure defining the cavity 6 in which a flanged portion 18*a* of the cylinder is re- eived with the interface between the wall of the head portion 12*a* and the outer wall of the flange portion 18*a* being sealed by a resilient O-ring 44. An upper opening in the head portion 12*a* is closed by a closure cap 46 secured to the housing 12 by a plurality of machine screws 48 with a resilient sealing gasket 49 interposed therebetween. A recess 50 in a depending portion 46*a* on the closure cap 46 carries a block or bumper 52 of resilient material that engages the upper end of the piston 26 at the termination of its return stroke, and an annular resilient bumper 54 is disposed in the lower end of the cavity 16 to cushion the termination of the power stroke of the piston 26. The bumper 54 is held in position at the bottom of the cylinder 18 by engagement with a shouldered portion 18*b* formed on the cylinder 18. The lower end of the interior of the cylinder 18 is placed in communication with the cavity 16 through a plurality of peripherally spaced ports or openings 56. The chamber 19 is sealed at its lower end by a resilient O-ring 58 placed between the lower wall of the piston 26 and the inner wall of the cylinder 18.

For the purpose of admitting pressurized air to the cavity 16 there is provided a plurality of small, metered bleed openings or ports 60 in the well of the cylinder 18 communicating with the chamber 19 and spaced above the openings 56 intermediate the length of the cylinder.

To provide means for sealing the interface between the outer wall of the piston 26 and the inner wall of the cylinder 18 there is provided a first O-ring 62 in an annular ring channel or groove 64 in the piston wall. Additionally to provide means for selectively supplying compressed air to the cavity 16, there is provided an additional O-ring 66 in an elongated annular channel or groove 68 forming a check valve so that the O-ring 66 is free to slide in the groove 68 into engagement with the upper and lower end surfaces of the groove 68. Moreover the groove 68 is recessed to provide one or more slots 74 extending from near the upper or outer edge of the groove 68 to below the lower or inner edge thereof. Thus when compressed air is supplied to the upper end of the cylinder 18 the air will pass through the interface by way of the slot 74, but when air is supplied to the lower end of the cylinder 18 below the O-ring 66, the O-ring 66 acts as a check valve and seals against the upper surface of the groove 68 thereby preventing the air from passing around the O-ring.

A thin metal sealing member 76 is provided to prevent escape of air from below the piston 26 around the driver blade 28. The driver blade 28 passes through a close fitting slot 76*a* in the sealing member 76 to form a substantial airseal. Of course it is to be understood that in the normal operation of a pneumatically actuated fastener driving tool, compressed air may leak or bleed out around the seals but such air leakage is insignificant in the overall operation of the fastener driving apparatus.

In order to charge the return air chamber 19 with more highly pressurized air, the bleed opening 60 is positioned to lie between the O-rings 62 and 66 when the piston 26 is in its lowermost position as indicated in FIG. 1.

It will be understood that the fastener driving tool 10 is in a normal or static position with the piston 26 in its uppermost position against the bumper 52. In this position the control valve assembly 22 is in a normal or static position discharging the space above the piston 26 to the atmosphere and blocking the flow of pressurized fluid from the reservoir 14. Actuation of the control valve assembly 22 simultaneously blocks the communication of the cylinder 18 with the atmosphere and directs the pressurized fluid from the fluid reservoir 14 into the upper end of the cylinder 18 driving the piston 26 and driver blade 28 downwardly through its power stroke. In the initial downward movement of the piston 26, there will be no bypass of pressurized fluid around the O-rings 62 or 66 even though the O-ring 66 may be in its lowermost position within the groove 68 since the passage of such pressurized fluid is blocked by the lower O-ring 62. The downward travel of the piston 26 drives the air below the piston through the ports 56 into the return air chamber 19 and the piston 26 ends its power stroke against the lower bumper 54. At this point the lower O-ring 62 has cleared the bleed openings 60 and pressurized fluid from above the piston 26 bypasses the upper O-rings 66 through the slot 74 and enters into the return air chamber 19 through the bleed openings 60.

Upon completion of the power stroke of the piston 26, the control valve assembly 22 is effective to shut off the communication betwen the fluid reservoir 14 and the top of the cylinder 18, and to exhaust the upper end of the cylinder 18 to the atmosphere through the passageways 20 and 24. As soon as the air in the upper end of the cylinder 18 is exhausted to the atmosphere, the pressurized fluid in the return air chamber 19 will be effective to drive the piston 26 upwardly to return to a normal or static position. Initial flow of air from the pressure return valve will take place through both bleed openings 60 and openings 56. The initial air through bleed opening 60 will be effective to raise the upper O-ring 66 against the upper inner surface of the groove 68 to check any further flow of air around the O-ring 66. In this manner the O-ring 66 functions as a check valve when the piston 26 is in its lowermost position, permitting the air to pass downwardly around the O-ring, but effectively blocking the return flow of air upwardly around the O-ring. The pressurized air from the return air chamber 19 will propel the piston upwardly to its uppermost position to return the fastener driving tool 10 to its normal position. Sufficient fluid will leak between the sealing means 76 and the driver blade 28 to discharge the fluid below the piston 26 to the atmosphere upon completion of the return stroke.

According to the present invention the improved control valve assembly 22 is provided for operating the tool 10 by sequentially connecting the open upper end of the cylinder 18 first to the fluid reservoir 14 and thereafter automatically to the atmosphere through passageway 24. The control valve assembly 22 includes a valve chamber 79 defined by an exhaust valve seat 80 carried on the housing 12 and having a downwardly and inwardly tapered port or opening 82 through which the passageway 20 is normally placed in communication with the exhaust passageway 24. The opening 82 can be closed by a resilient O-ring or valve element 84 carried on the upper end of an upper valve stem assembly 86. *This provides an exhaust valve means or structure.* A resilient valve element 88 is also carried on the upper valve stem assembly 86 disposed above an upper valve piston 90 forming a part of the upper valve stem assembly 86. The resilient valve element 88 normally closes a port or passageway 92 interposed between the reservoir 14 and the passageway 20 and forming a valve seat. *This provides a main valve means or structure. Thus, the opening 82 opened and closed by the O-ring 84 on the upper end of the valve stem 86 and the port 92 opened and closed by the valve element 88 on a lower portion of the valve stem 86 provide a combined main-exhaust valve assembly or structure.* The valve piston 90 closely fits and is slidably mounted within a valve cylinder 94 formed in a valve body 96 that is threadingly received within a tapped opening 98 in the housing 12. A metered leakage of fluid can pass between the side wall of the upper piston 90 and the inner wall of the valve cylinder 94 through the clearance area or passageway 100.

The control valve assembly 22 additionally includes a lower valve stem assembly 102 telescopically received within a recess in the bottom surface of the upper valve assembly 86 defining a lost-motion connection between the valve stem assemblies 86 and 102 and forming a cylinder 104. The lower valve stem assembly 102 and valve cylinder 104 form a chamber 106.

Forming a portion of the lower valve assembly 102 is a lower valve piston 108 slidably received within the valve cylinder 94. *The piston 108 in the cylinder 94 provides a first fluid pressure operated and slidably mounted member for controlling the opening of the combined main-exhaust valve structure.* An O-ring 110 seals the side surface of the lower valve piston 108 with the cylinder 94. A resilient valve element 112 is also carried on the lower valve stem assembly 102 on the piston 108 and engages against an annular projection or skirt 114 extending contiguous with the outer surface of the upper piston 90 downwardly from the lower end thereof to define a dashpot or time-delay chamber 116 therebetween. An additional O-ring or valve element 118 pneumatically seals the lower valve assembly 102 against the inner wall of the cylinder 104. A metered bleed passage 120 forming a dashpot or time-delay mechanism bypasses the O-ring 118 to provide communication between chamber 106 and the dashpot chamber 116. Additionally a port 122 extends through the side wall of the cylinder 104 near its upper end to exhaust chamber 106. *The return means provided by the port 102, the chamber 106, and the passage 120 supply pressurized fluid to the chamber 116 which acts on the lower surface of the piston 90 to close the combined main-exhaust valve structure, as set forth below. Thus, the piston 90 in the cylinder 94 provides a second fluid pressure operated and slidably mounted member for controlling movement of the combined main-exhaust valve structure to its closed position.*

A pilot valve assembly is included in the control valve assembly 22 to initiate the operation thereof and to permit the assembly 22 to be operated with a minimum manually applied force. This pilot valve assembly includes an operating pin 124 that is slideably mounted within an axial bore formed in a member 126 that is threadingly received within an opening 128 in the valve body 96. A trigger 129 provides for depression of the operating pin 124. An O-ring 130 seals the interface between the valve body 96 and the member 126. The upper end of the operating pin 124 is tapered and carries an O-ring 132 that operates as a valve element to control communication between the reservoir 14 and a bore or opening 134 through a passageway 136, or to selectively exhaust the bore 134 to the atmosphere through a clearance space forming an exhaust opening 138 around the operating pin 124. The bore 134 communicates through a passageway 142 with a chamber 140 formed between the lower end of the cylinder 94 and the lower piston 108.

Figure 3:
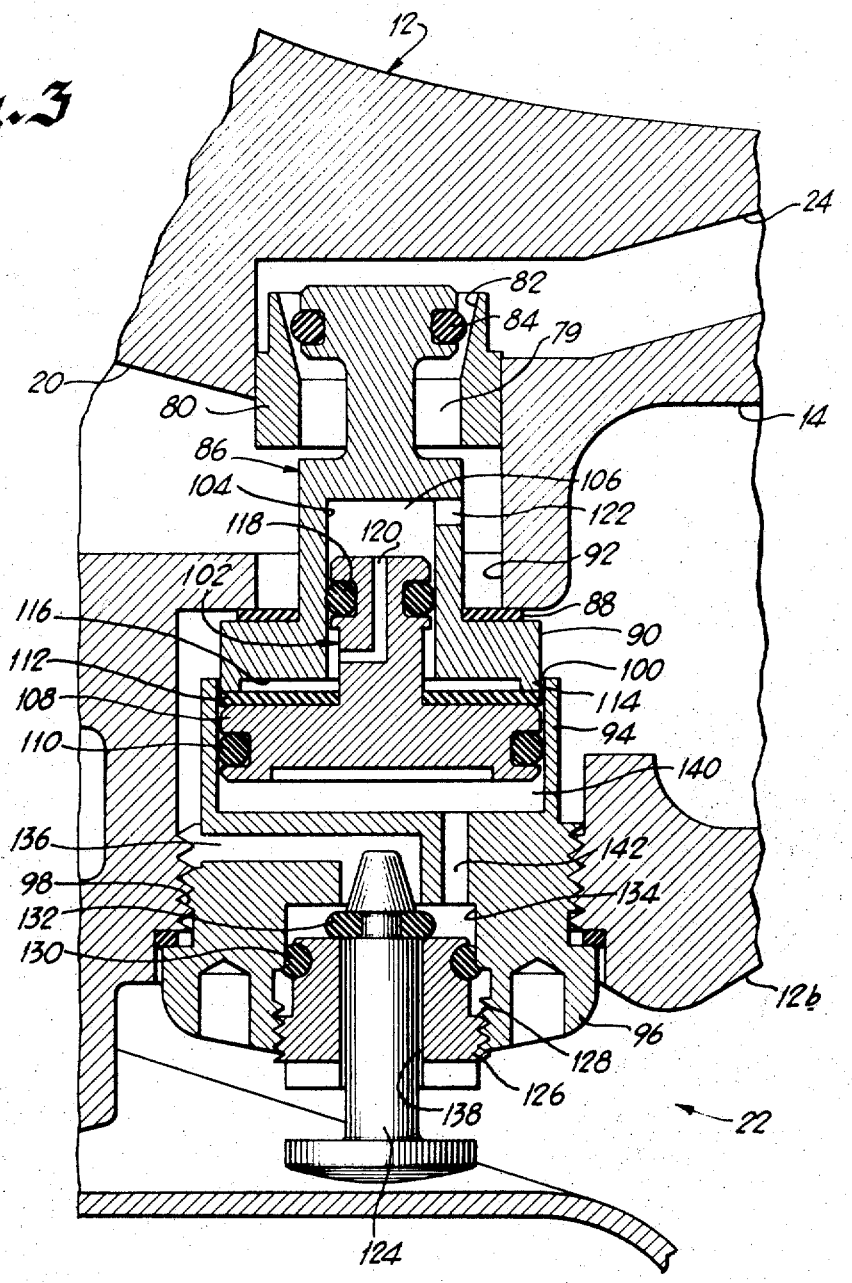
FIG. 3 is a fragmentary sectional view of the fastener lriving tool of FIG. 1, illustrating the control valve thereof n its normal or static position.

From the above description of the control valve assembly 22, its operation is believed clear, However, briefly, assuming the control valve assembly 22 to be in its normal or static position, as indicated in FIGURE 3, pressurized fluid from the fluid reservoir 14 passes through passageway 136, over the O-ring valve element 132, into the bore 134, through passageway 142, and into the control chamber 140 below the lower piston 108 carried by the lower valve assembly 102. Since the under surface of the lower valve element has a larger air-contact area from below than from above, the differential pressure is effective to drive and maintain the lower valve assembly 102 in its upper position and at the same time the upper valve assembly 86 is driven and held upwardly, as indicated in FIGURE 3. With the upper valve assembly 86 in its up position, the passageway 20 is placed in communication with the exhaust to the atmosphere through passageway 24 and opening 82. In this manner in the normal position of the tool the fluid in the upper open end of the piston 18 is exhausted to the atmosphere. Moreover any fluid in chamber 106 or in the dashpot chamber 116 is also exhausted to the atmosphere through passageway 120 and port 122. The valve element 188 seated against the port 92 is effective to block the communication between the fluid reservoir 14 and the passageway 20.

When the operating pin 124 is depressed upwardly by manual squeezing of the trigger 129, pressurized fluid to the control chamber 140 is cut off by the seating of the valve element 132 against the opening of passageway 136 and the air from the control chamber 140 is exhausted to the atmosphere through the passageway 142, bore 134, and exhaust opening 138. Under such conditions both the upper and lower valve stem assemblies 86 and 102 move downwardly due to the differential pressure acting on them, thereby connecting the fluid reservoir 14 to the upper end of the power cylinder 18 through the passageway 20 as best illustrated in the position of FIGURE 1.

Pressurized fluid will enter into the dashpot chamber 116 between the lower surface of the piston 90 and the valve element 112 at a metered rate as determined by the size of the metered bleed passageway 120. The pressurized fluid entering the dashpot chamber 116 will create a pressure differential below the upper valve stem assembly 86 greater than that above the upper valve stem assembly and pressurized fluid entering the dashpot chamber 116 through the metered passageway 100 will aid in driving the upper valve assembly 86 upwardly, closing off the pressurized fluid to drive the power piston 26 and opening the exhaust port from passageway 24 to exhaust the fluid from the upper end of the cylinder 18 to the atmosphere. At the same time any fluid in the chamber 106 will be exhausted to the atmosphere through port 122 and the tapered opening 82.

As soon as the fluid from the fluid reservoir 14 is cut off to the power cylinder 18, and the upper end of the power cylinder 18 is exhausted to atmosphere, the power piston 24 will be driven upwardly by the return action of the return mechanism. In the illustrated embodiment the compressed fluid from the air return chamber 19 will be discharged below the power piston 26 to drive the piston upwardly to its normal position in the manner heretofore described.

To complete the cycle of operation of the control valve, when the trigger 129 is released, the operating pin 124 moves down and fluid from the fluid reservoir 14 again enters the chamber 140 below the lower valve assembly 102 so that the pressure differential acting on the lower valve assembly will drive the lower valve assembly upwardly to its static position as indicated in FIGURE 3.

Although the present invention has been described by reference to only a single embodiment thereof, it will be apparent that numerous other modifications and embodiments will be devised by those skilled in the art, for example, the trigger 129 may be automatically actuated rather than manually actuated. It is intended therefore by the appended claims to cover those embodiments which will fall within the true spirit and scope of the present invention.

What is claimed as new and desired to be secured by Letters Patent of the United States is:

1. A control valve assembly for controlling a pneumatic fastener driving apparatus of the type having a power piston mounted in a power cylinder actuated in its drive stroke by the communication of the power cylinder with a fluid reservoir and automatically returned through a return stroke during the automatic sequential exhausting of the power cylinder, said control valve comprising [first] valve means movable between a first position exhausting said power cylinder to the atmosphere and a second position placing said power cylinder in communication with said fluid reservoir; a valve cylinder; [a second valve] *actuating* means including a valve piston in said valve cylinder positionable to one position biasing said [first] valve means into said first position when said valve cylinder is connected to said fluid reservoir and simultaneously blocking pressurized fluid from said reservoir from acting against said [first] valve means in a direction to bias said [first] valve means into said first [direction and] *position, said valve piston also being positionable to* a second position wherein pressure differential on said valve means is effective to move said [first] valve means to its said second position in conjunction with the movement of said [second] valve *piston to its second position* [means]; operating means *movable to a displaced position for* controlling the [position] *movement* of said [second] valve *piston to its second position* [means]; and time delay means for unblocking said pressurized fluid from acting on said [first] valve means *when said operating means is in its displaced position so that said fluid returns* [thereby to return] said [first] valve means to its said first position *while the operating means remains in its displaced position.*

2. A control valve assembly as set forth in claim 1 above and including a valve chamber having a first port communicating with the atmosphere, a second port communicating with the fluid reservoir, and a third port communicating with the power cylinder, said first and second ports respectively defining first and second valve seats; and wherein said [first] valve means has first and second valve [element] *elements* alternately cooperable with a respective one of said seats and movable in said valve chamber between said first position wherein said second valve element closes against said second valve seat to said second position wherein said first valve element closes against said first valve seat.

3. A control valve assembly as set forth in claim 2 above wherein said [first] valve means includes a valve piston, and said second valve element is carried on one end of [said] *the* valve piston *for this valve means.*

4. A control valve assembly as set forth in claim 2 above wherein said [first] valve means includes a valve piston [and wherein the valve piston on said second valve means] *which* abuts the valve piston [on said first valve] *in said actuating means* means to define a dashpot chamber therebetween, and wherein said time delay means comprises means for metering pressurized fluid *from said fluid reservoir* into said dashpot chamber [when said valve means are in second and said other positions respectively].

5. A control valve assembly as set forth in claim 4 above wherein said dashpot chamber is defined by a depending skirt extending from one of said valve pistons toward the other, and wherein a valve element is carried by one of said valve pistons to seal between said depending skirt and the other of said valve pistons.

6. A control valve assembly as defined in claim 4 above wherein said means for metering pressurized fluid includes a metered clearance passageway between said valve cylinder and said valve piston *included in* [carried by] said [first] valve means.

[7. A control valve assembly as set forth in claim 2 above wherein said first valve means includes a valve piston and the valve piston on said second valve means abuts the valve piston on said first valve means to define a dashpot chamber therebetween, and wherein said time delay means includes means for metering pressurized fluid from said fluid reservoir into said dashpot chamber.]

8. A control valve assembly as set forth in claim 2 above wherein said [first] valve means includes a valve piston and wherein said [first] valve means is provided with a recess forming a cylinder; said second valve element being cooperatively associated between said second port and the last mentioned valve piston; [said second] *the* valve [means] *piston in the actuating means* having a portion telescopically received in said recess; means forming a pneumatic interface seal between the last mentioned cylinder and the last mentioned portion to define a chamber in said last mentioned cylinder above said portion; port means communicating between said last mentioned chamber and said valve chamber; [said second valve means including a valve piston movable within said valve cylinder relative to the first mentioned piston], one of [said] *the two valve* pistons having a depending skirt extending toward the other, a [valve] *sealing* element carried by one of [said] *the two valve* pistons sealing against said skirt to define a dashpot chamber; and air bleed means defining a time delay dashpot and communicating between the last two mentioned chambers.

9. A control valve assembly as set forth in claim 1 wherein said operating means includes a manually [initiated operating pin movable between a depressed position] *actuated valve for* exhausting said valve cylinder to the atmosphere and [a normal position] *for* connecting said valve cylinder to the fluid reservoir.

10. A control valve assembly for controlling a pneumatic fastener driving apparatus of the type having a power piston mounted in a power cylinder actuated in its drive stroke by the communication of the power cylinder with a fluid reservoir and automatically driven through a return stroke by the automatic sequential exhausting of the power cylinder to the atmosphere; said control valve comprising [first] valve means movable between a first position exhausting said cylinder to the atmosphere and a second position placing said cylinder in communication with said fluid reservoir, [second valve] *fluid* actuating means positionable to one position biasing said [first] valve means into said first position; operating means controlling the position of said [second valve] *fluid actuating* means *and operable to shift the fluid actuating means and the valve means to second positions*; and a lost-motion dashpot connection between said valve means *and said fluid actuating means* effective upon release of said [second valve] *fluid actuating* means from said one position *to its second position* to permit return of said [first] valve means to said first position.

11. A control valve assembly for controlling a pneumatic fastener driving apparatus of the type having a power piston mounted in a power cylinder actuated in its drive stroke by the communication of the power cylinder with a fluid reservoir and automatically returned through a return stroke by the automatic sequential exhausting of power cylinder to the atmosphere; said control valve comprising [first] valve means movable between a first position exhausting said cylinder to the atmosphere and a second position placing said cylinder in communication with said fluid reservoir; [second valve] *fluid actuating* means positionable to one position biasing said [first] valve means into said first position and to another position whereby pressure differential on said [first] valve means between said fluid reservoir and the atmosphere is effective to move said [first] valve means to its said second position in conjunction with the movement of said [valve] *fluid actuated* means; operating means controlling the position of said [second valve] *fluid actuated* means; and a lost-motion dashpot connection between said valve means *and said fluid actuated means* effective upon release of said [second valve] *fluid actuated* means from said one position to permit a delayed return of said [first] valve means to said first position.

[12. A snap-acting control valve assembly for controlling a pneumatic fastener driving apparatus of the type having a power piston mounted in a power cylinder actuated in its drive stroke by the communication of the power cylinder with a fluid reservoir and returned through a return stroke by the exhausting of the power cylinder to ambient pressure; said control valve comprising a valve chamber formed in the housing of said apparatus and having a first valve port and seat for communication between said chamber and ambient pressure and having a second valve port and seat for communication between said valve chamber and the fluid reservoir, another port for communicating with the power cylinder of said apparatus, valve means reciprocally movable to alternately close against a respective one of said valve seats to place said last mentioned port selectively in communication with the ambient pressure and with the fluid reservoir, fluid pressure means including a valve cylinder and piston for biasing said valve means against one of said valve seats in response to the pressure of fluid in said valve cylinder; control valve means for controlling the pressure in said cylinder by selectively connecting said cylinder to said fluid reservoir or to the atmosphere; and means automatically returning said valve means against said one of said valve seats after movement therefrom under control of said fluid pressure means.]

13. A snap-acting control valve assembly for controlling a pneumatic fastener driving apparatus of the type having a power piston mounted in a power cylinder actuated in its drive stroke by the communication of the power cylinder with a fluid reservoir and returned through a return stroke by the exhausting of the power cylinder to ambient pressure; said control valve comprising a valve chamber formed in the housing of said apparatus and having a first valve port and seat for communication between said chamber and ambient pressure and having a second, opposed valve port and seat for communication between said chamber and the fluid reservoir, another port for communicating with the power cylinder of said apparatus; a valve stem assembly reciprocally movable to alternately close against a respective one of said opposed valve seats to sequentially place said last mentioned port in communication with the ambient pressure and with the fluid reservoir; and valve stem assembly including a piston and having a central recess therethrough forming a cylinder; a second valve stem assembly including a portion telescopically received in said last mentioned cylinder to provide a chamber therein; a port communicating between said chambers; a valve body; a valve cylinder formed in said valve body; said second valve stem assembly including a piston slideably received in said valve cylinder; a chamber formed between said pistons; valve means carried on one of said pistons for seating against the other of said pistons when said pistons are biased together; air bleed means communicating between said last mentioned chamber and said fluid reservoir; air bleed means communicating between the last two mentioned chambers, and means for sequentially connecting the last mentioned cylinder with the fluid reservoir and discharging the last mentioned cylinder to ambient pressure.

14. A fastener driving tool comprising a housing including a power cylinder and a fluid reservoir supplied with fluid under pressure; fastener driving means including a power piston slideably mounted in the power cylinder; a control valve assembly carried on the housing and operable to sequentially connect one end of said power cylinder between a normal position exhausting to the atmosphere and an operated position communicating with said fluid reservoir; said control valve comprising upper valve stem means movable between a first position exhausting said power cylinder to the atmosphere and a second position placing said power cylinder in communication with said fluid reservoir; a valve cylinder, a lower valve stem means including a lower piston in said valve cylinder positionable to one position biasing said upper valve stem means into said first position when said cylinder is connected to said fluid reservoir and simultaneously blocking pressurized fluid from said reservoir from acting against said upper valve stem means in a direction to bias said upper valve stem means into said first direction, and a second position wherein pressure differential on said valve stem means is effective to move said upper valve stem means to its said second position in conjunction with the movement of said lower valve stem means; a fluid return chamber communicating with the other end of said power cylinder; a fluid bleed passageway intermediate the length of said power cylinder communicating with said fluid return chamber effective to return said power piston to its normal position upon exhaustion of fluid to the atmosphere from the said one end of said power cylinder; operating means controlling the position of said lower valve stem means; and time delay means operable to direct pressurized fluid from said fluid reservoir to act on said upper valve stem means thereby to return said upper valve stem means to its said first position.

[15. A control valve assembly for controlling a pneumatic fastener driving apparatus of the type having a power piston mounted in a power cylinder actuated in its drive stroke by the communication of the power cylinder with a fluid reservoir and automatically driven through a return stroke by the automatic sequential exhausting of the power cylinder to the atmosphere; said control valve :omprising first valve means movable between a first posi-
ion exhausting said cylinder to the atmosphere and a
econd position placing said cylinder in communication
vith said fluid reservoir, second valve means positionable
o one position biasing said first valve means into said
irst position; operating means controlling the position of
aid second valve means; and means interconnecting said
'alve means effective upon release of said second valve
neans from said one position to provide a sequential re-
urn of said first valve means to said first position.]

[16. A control valve assembly for controlling a pneu-
natic fastener driving apparatus of the type having a
ower piston mounted in a power cylinder actuated in its
lrive stroke by the communication of the power cylinder
vith a fluid reservoir and automatically returned through
ı return stroke during the automatic sequential exhausting
of the power cylinder, said control valve comprising first
'alve means movable between a first position exhausting
aid power cylinder to the atmosphere and a second posi-
ion placing said power cylinder in communication with
aid fluid reservoir; a valve cylinder; a second valve means
ncluding a valve piston in said valve cylinder positionable
o one position biasing said first valve means into said first
osition when said valve cylinder is connected to said fluid
eservoir and simultaneously blocking pressurized fluid
rom said reservoir from acting against said first valve
neans in a direction to bias said first valve means into
aid first direction, and a second position wherein pressure
lifferential on said valve means is effective to move said
irst valve means to its said second position in conjunction
vith the movement of said second valve means; operating
neans controlling the position of said second valve means;
nd means for automatically unblocking said pressurized
luid from acting on said first valve means thereby to re-
urn said first valve means to its said first position.]

*17. In a tool for automatically and sequentially op-
rating a fastener driving means through a power stroke
nd a return stroke within a cylinder on a housing to drive
fastener that is automatically moved to a position to
e driven after each return stroke,*

*a fluid pressure reservoir in the housing,*

*an exhaust means in the housing,*

*a combined main valve and exhaust valve structure movable in the housing between a first position in which the main valve is closed and the exhaust valve is opened to connect the cylinder above the fastener driving means to the exhaust means and a second position in which the main valve is opened to supply pressurized fluid from the reservoir to the cylinder and the exhaust valve is closed.*

*a control assembly for controlling movement of the combined main valve and exhaust valve structure, said combined main valve and exhaust valve structure including main and exhaust valve seats stationary on the housing and rigidly connected and movable main and exhaust valve means,*

*first and second concentric and at least partially telescoping structures slidably mounted on the housing for sliding movement relative to each other and to the housing for controlling movement of the combined main valve and exhaust valve structure between its first and second positions, said second structure having a fluid pressure receiving surface,*

*a manually actuated control carried on the housing and operable to an actuated position to control movement of the first structure to a displaced position to effect movement of the combined main valve and exhaust valve structure to its first position to admit pressurized fluid from the reservoir to the cylinder,*

*and a return means including structure defining a fluid passageway means with an inlet opening exposed to the fluid from the reservoir only when the combined main valve and exhaust valve structure is in said second position for supplying a part of the pressurized fluid made available to the cylinder by the main valve to said surface of said second structure to slide said second structure relative to said first structure and effect movement of the combined main valve and exhaust valve structure to said first position while said first structure remains in said displaced position and said manually actuated control remains in said actuated position.*

*18. In a tool for automatically and sequentially operating a fastener driving means through a power stroke and a return stroke in a cylinder to drive a fastener that is moved to a position to be driven after each return stroke,*

*a fluid pressure source,*

*an exhaust means,*

*a main-exhaust valve assembly including both a main valve structure mounted for sliding rectilinear movement to opened and closed positions to selectively connect the fluid pressure source to the cylinder above the fastener driving means and an exhaust valve structure movable to opened and closed positions for selectively connecting the exhaust means to the cylinder above the fastener driving means,*

*piston means mounted for sliding rectilinear movement in the housing and including means for controlling the movement of the main-exhaust valve assembly to their opened and closed positions,*

*a manually controlled valve assembly for selectively establishing connections from the fluid pressure source and the atmosphere to the piston and operable to an actuated position for controlling movement of the piston means to effect movement of the main valve structure to its opened position and the exhaust valve structure to its closed position,*

*and return means including a passageway means passing at least in part through a part of the movable main-exhaust valve assembly which is exposed to the fluid pressure only when the main valve structure is in its open position for supplying a portion of the fluid pressure made available to the cylinder by the main valve structure to effect movement of the main valve structure and the exhaust valve structure to their closed and opened positions respectively while the manually controlled valve assembly remains in its actuated position.*

*19. The tool set forth in claim 18 in which the passageway means in the return means includes a fluid pressure metering portion to provide a time delay between the sequential movements of the main and exhaust valve structures to their open and closed positions.*

*20. The tool set forth in claim 18 in which the movement of the main and exhaust valve structures to their closed and opened positions respectively connects said passageway means to the atmosphere through the exhaust valve structure.*

*21. The tool set forth in claim 18 in which the main valve structure includes wall structure defining a cylindrical recess, a part of said passageway means passing through said wall structure.*

*22. The tool set forth in claim 21 including a cylindrical structure disposed in said recess having an axially extending passage forming another part of said passageway means.*

*23. The tool set forth in claim 22 in which the passage in said cylindrical structure forms a fluid pressure metering means.*

*24. In a tool for automatically and sequentially operating a fastener driving means through a power stroke and a return stroke in a cylinder to drive a fastener that is automatically moved to a position to be driven after each return stroke,*

*a fluid pressure reservoir,*

*an exhaust means,*

*a combined main valve and exhaust valve structure slidable between a first position in which the main valve is closed and the exhaust valve is opened to connect the cylinder above the fastener driving means to the*

*exhaust means and a second position in which the main valve is opened to supply pressurized fluid from the reservoir to the cylinder and the exhaust valve is closed, said combined main valve and exhaust valve structure including stationary main and exhaust valve seats and rigidly connected and movable main and exhaust valve means,*

*a control assembly for controlling movement of the combined main valve and exhaust valve structure including*

*a first pressurized fluid operated and slidably mounted member for controlling movement of the combined main valve and exhaust valve structure from said first position to said second position, and*

*a second pressurized fluid operated and slidably mounted memebr for controlling movement of the combined main valve and exhaust valve structure from said second position to said first position,*

*a manually actuated control valve operable to selectively connect a surface of said first member to the fluid pressure reservoir and the atmosphere and operable to an actuated position to effect movement of said first member to a displaced position to move the combined main valve and exhaust valve structure to said second position,*

*and return means including structure defining a fluid passageway means with an air inlet opening exposed to the fluid from the reservoir only when the combined main valve and exhaust valve structure is in said second position for supplying a part of the pressurized fluid made available to the cylinder by the main valve to a surface of said second member to move said second member and effect movement of the combined main valve and exhaust valve structure to said first position while said first member remains in said displaced position and said manually actuated control valve remains in said actuated position.*

*25. The tool set forth in claim 24 in which the first and second members include parts mounted in telescoping and sliding relation.*

*26. The tool set forth in claim 24 in which at least the part of the combined main valve and exhaust valve structure that forms the main valve has structure forming a central opening through which at least a part of the structure defining said fluid passageway means extends.*

*27. The tool set forth in claim 24 in which the passageway means includes a restricted pressurized fluid metering portion to control the time between the movement of the combined main valve and exhaust valve structure to the second position and the displacement of the second member to effect movement of the combined main valve and exhaust valve structures to said first position.*

*28. The tool set forth in claim 24 in which the first member includes a piston portion supplied with pressurized fluid from the reservoir for biasing the first member to its normal position.*

References Cited

The following references, cited by the Examiner, are of record in the patented file of this patent or the original patent.

UNITED STATES PATENTS

| | | | |
|---|---|---|---|
| 3,278,102 | 10/1966 | Siegmann | 227—130 |
| 2,914,032 | 11/1959 | Powers et al. | 173—169 |
| 2,915,754 | 12/1959 | Wandel | 91—461 X |
| 2,989,948 | 6/1961 | Forrester | 173—169 |
| 2,995,114 | 8/1961 | Starr | 173—169 |
| 3,051,135 | 8/1962 | Smith | 173—169 |
| 3,094,901 | 6/1963 | Wandell et al. | 173—169 |
| 3,106,134 | 10/1963 | Osborne | 91—454 |
| 3,173,340 | 3/1965 | Doyle et al. | 91—461 X |

PAUL E. MASLOUSKY, Primary Examiner

U.S. Cl. X.R.

91—399, 461; 133—169